A. S. RAMAGE.
ORGANIC PEROXID AND PROCESS OF PRODUCING SAME.
APPLICATION FILED MAR. 31, 1906. RENEWED FEB. 6, 1914.
1,097,940.
Patented May 26, 1914.
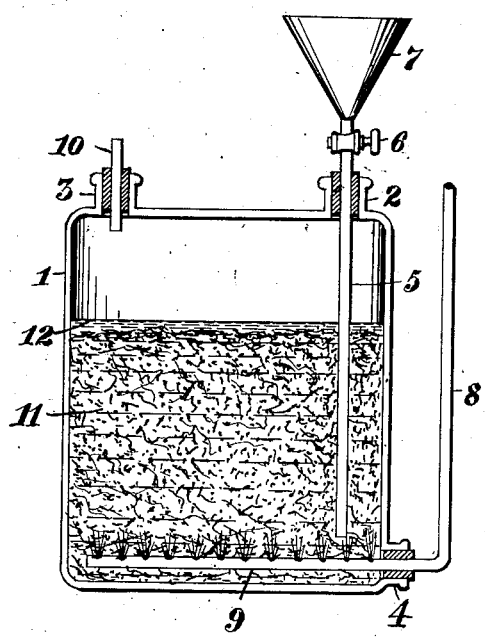

UNITED STATES PATENT OFFICE.

ALEXANDER S. RAMAGE, OF DETROIT, MICHIGAN, ASSIGNOR TO EUGENE A. BYRNES AND CLINTON PAUL TOWNSEND, OF WASHINGTON, DISTRICT OF COLUMBIA.

ORGANIC PEROXID AND PROCESS OF PRODUCING SAME.

1,097,940.	Specification of Letters Patent.	Patented May 26, 1914.

Application filed March 31, 1906, Serial No. 309,095. Renewed February 6, 1914. Serial No. 817,054.

*To all whom it may concern:*

Be it known that I, ALEXANDER S. RAMAGE, a citizen of the United States, residing at Detroit, in the county of Wayne and State of Michigan, have invented certain new and useful Improvements in Organic Peroxid and Processes of Producing Same, of which the following is a specification.

I have discovered that when cineol is subjected to the continued action of ozone, in the presence of platinum black and at atmospheric temperatures, substantially the entire body of the liquid is converted into a product having new and useful characteristics. This product is a thick, viscous, non-volatile liquid having about the consistency of syrup. It is of a brownish-yellow color, is chemically neutral, and is insoluble in water but readily soluble in petroleum. The exact chemical composition of the product is not known, but it is an organic peroxid, containing eighteen times its volume of loosely-combined oxygen, which is slowly evolved on contact with water. It liberates iodin from moistened crystals of potassium iodid, one hundred cubic centimeters of the new compound liberating thirty grams of iodin. It decomposes explosively when heated. The product is miscible with a heavy mineral oil or melted vaseline. The new product is an effective germicide and disinfectant, destroying all pathogenic bacteria. When applied to normal skin, it produces little sensation, but upon raw skin it gives an intensely-cold stinging sensation.

To make this product, a body of cineol or a hydrocarbon containing a large percentage of cineol, is filled with a loose mass of platinized asbestos and streams of ozone or ozonized air are passed upward through the liquid for a period of about six hours. The product is then poured off from the platinized asbestos, a new portion of cineol is introduced into the vessel, and the operation repeated.

A suitable apparatus for making the new product is shown in the accompanying drawing, in which the figure is a transverse, vertical section.

The vessel 1 for receiving the cineol is here shown as a Wolff bottle, having necks 2, 3 at the top and a side tubulure 4 at the bottom. A liquid supply-pipe 5, having a cock 6 and funnel 7, extends through a stopper in the neck 2. A pipe 8 for supplying ozone or ozonized air extends through a stopper in tubulure 4, its lower horizontal portion 9, within the vessel 1, being perforated to deliver the ozone in streams. A pipe 10 for delivering unabsorbed gases extends through a stopper in neck 3. The vessel 1 contains a body 11 of platinized asbestos and is usually filled with cineol to a level indicated by the line 12.

I claim:—

1. The herein-described new product, being a peroxidized terpene, a thick, viscous, non-volatile liquid of brownish-yellow color, insoluble in water but soluble in petroleum, chemically neutral, containing about 18 times its volume of loosely-combined oxygen, liberating iodin from potassium iodid, and decomposing explosively when heated.

2. The process of producing organic peroxid, which consists in subjecting a body of cineol to the continued action of ozone, in the presence of a catalytic agent, at atmospheric temperatures, until the cineol is converted into a thick, viscous, non-volatile liquid of brownish-yellow color, insoluble in water but soluble in petroleum, chemically neutral, an active oxidizing agent and germicide, decomposing explosively, as set forth.

3. The process of producing organic peroxid, which consists in subjecting a body of cineol to the continued action of ozone, in the presence of platinum black, until the cineol is converted into a thick, viscous, non-volatile liquid, as set forth.

In testimony whereof, I affix my signature in presence of two witnesses.

ALEXANDER S. RAMAGE.

Witnesses:
  ALVA L. BUTZ,
  JONATHAN PALMER, Jr.